US012739890B2

(12) United States Patent
Wang et al.

(10) Patent No.: US 12,739,890 B2
(45) Date of Patent: Sep. 15, 2026

(54) REPETITION DETERMINATION METHOD, REPETITION DETERMINATION APPARATUS, TERMINAL, AND NETWORK SIDE DEVICE

(71) Applicant: DATANG MOBILE COMMUNICATIONS EQUIPMENT CO., LTD., Beijing (CN)

(72) Inventors: Lei Wang, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 323 days.

(21) Appl. No.: 18/557,032

(22) PCT Filed: Apr. 22, 2022

(86) PCT No.: PCT/CN2022/088441
§ 371 (c)(1),
(2) Date: Oct. 24, 2023

(87) PCT Pub. No.: WO2022/237498
PCT Pub. Date: Nov. 17, 2022

(65) Prior Publication Data

US 2024/0373469 A1 Nov. 7, 2024

(30) Foreign Application Priority Data

May 11, 2021 (CN) ......................... 202110511902.1

(51) Int. Cl.
*H04W 74/0833* (2024.01)
*H04L 1/08* (2006.01)
(Continued)

(52) U.S. Cl.
CPC ... *H04W 74/0833* (2013.01); *H04W 56/0045* (2013.01); *H04W 72/0446* (2013.01); *H04W 72/1268* (2013.01)

(58) Field of Classification Search
None
See application file for complete search history.

(56) References Cited

U.S. PATENT DOCUMENTS

2019/0342921 A1* 11/2019 Loehr .................. H04L 5/0044
2021/0051707 A1 2/2021 Rastegardoost et al.
(Continued)

FOREIGN PATENT DOCUMENTS

CN 110062474 A 7/2019
CN 111699745 A 9/2020
(Continued)

OTHER PUBLICATIONS

Supplementary European Search Report in EP patent Application No. 22806468.9, mailed on Jul. 10, 2024.
(Continued)

*Primary Examiner* — Jenee Holland
(74) *Attorney, Agent, or Firm* — Ladas & Parry, LLP

(57) ABSTRACT

A repetition determination method is provided by the present disclosure, which solves the problem on how to determine a number of repetitions for Msg3 PUSCH and available uplink slots. The method of the present disclosure includes: obtaining, by a terminal, an RAR, where the RAR includes an uplink grant and first information other than the UL grant; determining, by the terminal, a number of repetitions for an initial transmission of an Msg3 PUSCH according to the UL grant and/or the first information; and determining, by the terminal, one or more target slots for transmitting the Msg3 PUSCH according to the number of repetitions for the initial
(Continued)

transmission of the Msg3 PUSCH and available slots for transmitting the Msg3 PUSCH.

20 Claims, 4 Drawing Sheets

(51) Int. Cl.

| | |
|---|---|
| ***H04W 56/00*** | (2009.01) |
| ***H04W 72/0446*** | (2023.01) |
| ***H04W 72/1268*** | (2023.01) |

(56) References Cited

U.S. PATENT DOCUMENTS

| | | | | |
|---|---|---|---|---|
| 2021/0058823 | A1 | 2/2021 | Liu et al. | |
| 2021/0084689 | A1 | 3/2021 | Ly | |
| 2024/0215015 | A1 * | 6/2024 | Su | H04L 5/1469 |
| 2025/0055628 | A1 * | 2/2025 | Yao | H04L 1/189 |
| 2025/0301473 | A1 * | 9/2025 | Wu | H04L 1/0072 |

FOREIGN PATENT DOCUMENTS

| | | | |
|---|---|---|---|
| EP | 3780871 | A1 | 2/2021 |
| WO | 2019216818 | A1 | 11/2019 |
| WO | 2020159419 | A1 | 8/2020 |

OTHER PUBLICATIONS

ZTE Corporation, "Feature lead summary on support of Type A PUSCH repetitions for Msg3," 3GPP TSG RAN WG1 #104-e, R1-2102226, Feb. 8, 2021.
ZTE Corporation, "Feature lead summary#2 on coverage enhancement for channels other than PUSCH and PUCCH" 3GPP TSG RAN WG1 #103-e, R1-2009805, Nov. 19, 2020.
CATT, "Discussion on coverage enhancement for channels other than PUSCH and PUCCH" 3GPP TSG RAN WG1 #103-e, R1-2007876, Nov. 2, 2020.
Office action and search report in Chinese patent application No. 202110511902.1, issued on Mar. 31, 2025.
International Search Report for PCT/CN2022/088441 issued on Jun. 18, 2022 and its English Translation provided by WIPO.
Written Opinion for PCT/CN2022/088441 issued on Jun. 18, 2022 and its English Translation provided by WIPO.
International Preliminary Report on Patentability for PCT/CN2022/088441 issued on Nov. 14, 2023 and its English Translation provided by WIPO.
"Feature lead summary #2 on support of Type A PUSCH repetitions for Msg3," 3GPP TSG RAN WG1 #104b-e R1-2104101, e-Meeting, Apr. 12-20, 2021, Agenda item: 8.8.3, Source: Moderator (ZTE Corporation).

* cited by examiner

REPETITION DETERMINATION METHOD, REPETITION DETERMINATION APPARATUS, TERMINAL, AND NETWORK SIDE DEVICE

CROSS REFERENCE TO RELATED APPLICATIONS

This application is the U.S. national phase of PCT Application No. PCT/CN2022/088441 filed on Apr. 22, 2022, which claims a priority to the Chinese patent application No. 202110511902.1 filed on May 11, 2021, the disclosures of which are incorporated herein by reference in their entireties.

TECHNICAL FIELD

The present disclosure relates to the field of communications technology, and in particular, to a repetition determination method, a repetition determination apparatus, a terminal and a network side device.

BACKGROUND

In the current 5G (5th Generation, fifth generation) NR (New RAT, new air interface) mobile communication system, a coverage area of a cell is an important technical indicator. Msg3 PUSCH (Physical Uplink Shared Channel) transmission is a bottleneck of coverage in the 5G NR system. Therefore, how to enhance the coverage area of Msg3 PUSCH is an important topic in current research.

Currently, a retransmission mechanism of repetition type A is introduced for Msg3 PUSCH transmission. However, there is currently no clear solution on how to determine a number of repetitions for Msg3 PUSCH. At the same time, it is considered that the transmission of Msg3 PUSCH is in an initial access stage, the terminal at this time can only obtain the common TDD uplink and downlink configurations of the cell sent by SIB1 (System Information Block1), and cannot learn the terminal-dedicated (UE-dedicated) uplink and downlink configurations of other terminals. When the Msg3 PUSCH is transmitted on a plurality of slots, there is currently no feasible method on how to determine available uplink slots.

SUMMARY

The present disclosure is to provide a repetition determination method, a repetition determination apparatus, a terminal and a network side device.

Specifically, the embodiments of the present disclosure provide a repetition determination method, which includes: obtaining, by a terminal, a random access response (RAR), where the RAR includes an uplink (UL) grant and first information other than the UL grant; determining, by the terminal, a number of repetitions for an initial transmission of an Msg3 PUSCH according to the UL grant and/or the first information; and determining, by the terminal, one or more target slots for transmitting the Msg3 PUSCH according to the number of repetitions for the initial transmission of the Msg3 PUSCH and available slots for transmitting the Msg3 PUSCH.

The method further includes: receiving a first indication signaling sent by a network side device, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

The determining, by the terminal, the number of repetitions for the initial transmission of the Msg3 PUSCH according to the UL grant and the first information includes: determining the number of repetitions for the initial transmission of the Msg3 PUSCH according to one or more reserved bits in the first information and one or more reserved bits in the UL grant.

The determining, by the terminal, the number of repetitions for the initial transmission of the Msg3 PUSCH according to the UL grant and the first information includes: determining the number of repetitions for the initial transmission of the Msg3 PUSCH according to a value range of a timing advance (TA) value carried in the first information and indication information carried in the UL grant.

The determining the number of repetitions for the initial transmission of the Msg3 PUSCH according to the value range of the timing advance (TA) value carried in the first information and the indication information carried in the UL grant includes at least one of the following methods: determining, through the value range of TA value carried in the first information, a time domain resource allocation table used; indicating, through a time domain resource allocation (TDRA) indication field carried in the UL grant, time domain resource allocation information in the time domain resource allocation table; and determining the number of repetitions for the initial transmission of the Msg3 PUSCH according to the time domain resource allocation information; determining, through the value range of TA value carried in the first information, a value range of the number of repetitions for the initial transmission of the Msg3 PUSCH; indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH; determining, through second indication information carried in the UL grant, a number of repetitions indicated by the UL grant; and determining the number of repetitions for the initial transmission of the Msg3 PUSCH according to the scaling factor and the number of repetitions indicated by the UL grant.

The method further includes: determining the available slots for transmitting the Msg3 PUSCH according to a predefined rule or a network indication.

The determining the available slots for transmitting the Msg3 PUSCH according to the predefined rule includes one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

The determining the available slots for transmitting the Msg3 PUSCH according to the network indication includes: receiving second indication signaling sent by a network side device, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: SSB; CORESET #0; or type0 CSS.

In a case that the available slots for transmitting the Msg3 PUSCH include the semi-static flexible slots, then the terminal does not expect the network side device to transmit downlink data or configure downlink symbol on the semi-static flexible symbol occupied by the Msg3 PUSCH.

Specifically, the embodiments of the present disclosure also provide a repetition determination method, which includes: indicating, by a network side device, a terminal of a number of repetitions for an initial transmission of an Msg3 PUSCH through an UL grant and/or first information other than the UL grant in a random access response (RAR); and determining, by the network side device, one or more target slots for transmitting the Msg3 PUSCH according to the number of repetitions for the initial transmission of the Msg3 PUSCH and the available slots for transmitting the Msg3 PUSCH.

The method further includes: sending first indication signaling to the terminal, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

The indicating, by the network side device, the terminal of the number of repetitions for the initial transmission of the Msg3 PUSCH through the UL grant and/or first information other than the UL grant in the random access response (RAR) includes: indicating, through one or more reserved bits in the first information and one or more reserved bits in the UL grant, the terminal of the number of repetitions for the initial transmission of the Msg3 PUSCH.

The indicating, by the network side device, the terminal of the number of repetitions for the initial transmission of the Msg3 PUSCH through the UL grant and/or first information other than the UL grant in the random access response (RAR) includes: indicating the terminal of the number of repetitions for the initial transmission of the Msg3 PUSCH according to a value range of a timing advance (TA) value carried in the first information and indication information carried in the UL grant.

The indicating the terminal of the number of repetitions for the initial transmission of the Msg3 PUSCH according to the value range of the timing advance (TA) value carried in the first information and indication information carried in the UL grant includes at least one of the following methods: determining, through the value range of TA value carried in the first information, a time domain resource allocation table used by the terminal; indicating, through a time domain resource allocation (TDRA) indication field carried in the UL grant, time domain resource allocation information in the time domain resource allocation table; and indicating the terminal of the number of repetitions for the initial transmission of the Msg3 PUSCH according to the time domain resource allocation information; determining, through the value range of TA value carried in the first information, a value range of the number of repetitions for the initial transmission of the Msg3 PUSCH for the terminal, indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH for the terminal; determining, through second indication information carried in the UL grant, a number of repetitions indicated by the UL grant; and determining the number of repetitions for the initial transmission of the Msg3 PUSCH for the terminal according to the scaling factor and the number of repetitions indicated by the UL grant.

The method further includes: determining the available slots for transmitting the Msg3 PUSCH according to a predefined rule.

The determining the available slots for transmitting the Msg3 PUSCH according to the predefined rule includes one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

The method further includes: sending second indication signaling to the terminal, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: SSB; CORESET #0; or type0 CSS.

In a case that the available slots for transmitting the Msg3 PUSCH include the semi-static flexible slots, then the network side device does not transmit downlink data or configure downlink symbol on the semi-static flexible symbol occupied by the Msg3 PUSCH.

Specifically, the embodiment of the present disclosure also provides a terminal, which includes: a memory, a transceiver, and a processor, where the memory is used to store computer program, the transceiver is used to send and receive data under the control of the processor, and the processor is used to read the computer program in the memory and perform the following operations of: obtaining a random access response (RAR), where the RAR includes an UL grant and first information other than the UL grant; determining a number of repetitions for an initial transmission of an Msg3 PUSCH according to the UL grant and/or the first information; and determining one or more target slots for transmitting the Msg3 PUSCH according to the number of repetitions for the initial transmission of the Msg3 PUSCH and available slots for transmitting the Msg3 PUSCH.

The transceiver is further used to: receive a first indication signaling sent by a network side device, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

The processor is used to read program instructions in the memory and perform the following operations of: determining the number of repetitions for the initial transmission of the Msg3 PUSCH according to one or more reserved bits in the first information and one or more reserved bits in the UL grant.

The processor is used to read program instructions in the memory and perform the following operations of: determining the number of repetitions for the initial transmission of the Msg3 PUSCH according to a value range of a timing advance (TA) value carried in the first information and indication information carried in the UL grant.

The processor is used to read program instructions in the memory and perform at least one of the following operations of: determining, through the value range of TA value carried in the first information, a time domain resource allocation table used; indicating, through a time domain resource allocation (TDRA) indication field carried in the UL grant, time domain resource allocation information in the time domain resource allocation table; and determining the number of repetitions for the initial transmission of the Msg3 PUSCH according to the time domain resource allocation information; determining, through the value range of TA value carried in the first information, a value range of the number of repetitions for the initial transmission of the Msg3 PUSCH; indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH; determining, through second indication information carried in the UL grant, a number of repetitions indicated by the UL grant; and determining the number of repetitions for the initial transmission of the Msg3 PUSCH according to the scaling factor and the number of repetitions indicated by the UL grant.

The processor is used to read program instructions in the memory and perform the following operations of: determining the available slots for transmitting the Msg3 PUSCH according to a predefined rule or a network indication.

The processor is used to read program instructions in the memory and perform at least one of the following operations of: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

The transceiver is further used to: receive second indication signaling sent by a network side device, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: SSB; CORESET #0; or type0 CSS.

In a case that the available slots for transmitting the Msg3 PUSCH include the semi-static flexible slots, then the terminal does not expect the network side device to transmit downlink data or configure downlink symbol on the semi-static flexible symbol occupied by the Msg3 PUSCH.

Specifically, the embodiment of the present disclosure also provides a repetition determination apparatus, which includes: an obtaining unit, used to obtain a random access response (RAR), where the RAR includes an UL grant and first information other than the UL grant; a first processing unit, used to determine a number of repetitions for an initial transmission of an Msg3 PUSCH according to the UL grant and/or the first information; and a second processing unit, used to determine one or more target slots for transmitting the Msg3 PUSCH according to the number of repetitions for the initial transmission of the Msg3 PUSCH and available slots for transmitting the Msg3 PUSCH.

Specifically, an embodiment of the present disclosure also provides a computer-readable storage medium on which a computer program is stored, when the computer program is executed by a processor, the steps of the repetition determination method as described above are implemented.

Specifically, an embodiment of the present disclosure also provides a network side device, which includes a memory, a transceiver, and a processor, where the memory is used to store computer program, the transceiver is used to send and receive data under the control of the processor, and the processor is used to read the computer program in the memory and perform the following operations of: indicating, through an UL grant and/or first information other than the UL grant in a random access response (RAR), a terminal of a number of repetitions for an initial transmission of an Msg3 PUSCH; and determining one or more target slots for transmitting the Msg3 PUSCH according to the number of repetitions for the initial transmission of the Msg3 PUSCH and the available slots for transmitting the Msg3 PUSCH.

The transceiver is further used to: send first indication signaling to the terminal, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

The processor is used to read the computer program in the memory and perform the following operations of: indicating, through one or more reserved bits in the first information and one or more reserved bits in the UL grant, the terminal of the number of repetitions for the initial transmission of the Msg3 PUSCH.

The processor is used to read the computer program in the memory and perform the following operations of: indicating the terminal of the number of repetitions for the initial transmission of the Msg3 PUSCH according to a value range of a timing advance (TA) value carried in the first information and indication information carried in the UL grant.

The processor is used to read program instructions in the memory and perform at least one of the following operations of: determining, through the value range of TA value carried in the first information, a time domain resource allocation table used by the terminal; indicating, through a time domain resource allocation (TDRA) indication field carried in the UL grant, time domain resource allocation information in the time domain resource allocation table; and indicating the terminal of the number of repetitions for the initial transmission of the Msg3 PUSCH according to the time domain resource allocation information; determining, through the value range of TA value carried in the first information, a value range of the number of repetitions for the initial transmission of the Msg3 PUSCH for the terminal, indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH for the terminal; determining, through second indication information carried in the UL grant, a number of repetitions indicated by the UL grant; and determining the number of repetitions for the initial transmission of the Msg3 PUSCH for the terminal according to the scaling factor and the number of repetitions indicated by the UL grant.

The processor is used to read program instructions in the memory and perform the following operations of: determining the available slots for transmitting the Msg3 PUSCH according to a predefined rule.

The processor is used to read program instructions in the memory and perform at least one of the following operations of: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

The transceiver is further used to: send second indication signaling to the terminal, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: SSB; CORESET #0; or type0 CSS.

In a case that the available slots for transmitting the Msg3 PUSCH include the semi-static flexible slots, then the network side device does not transmit downlink data or configure downlink symbol on the semi-static flexible symbol occupied by the Msg3 PUSCH.

Specifically, an embodiment of the present disclosure also provides a repetition determination apparatus, which includes: a fourth processing unit, used to indicate, through an UL grant and/or first information other than the UL grant in a random access response (RAR), a terminal of a number of repetitions for an initial transmission of an Msg3 PUSCH; and a fifth processing unit, used to determine one or more target slots for transmitting the Msg3 PUSCH according to the number of repetitions for the initial transmission of the Msg3 PUSCH and available slots for transmitting the Msg3 PUSCH.

Specifically, an embodiment of the present disclosure also provides a processor-readable storage medium, the processor-readable storage medium is stored with computer program, and the computer program is used for causing the processor to perform the above-mentioned steps of the repetition determination method.

DETAILED DESCRIPTION

In the embodiment of the present disclosure, the term "and/or" describes the association relationship of associated objects, indicating that there can be three relationships, for example, A and/or B, which may represent these three cases: A exists alone, A and B exist simultaneously, and B exists alone. The character "/" generally indicates that the associated objects are an "or" relationship.

In the embodiments of the present application, the term "plurality" refers to two or more than two, and other quantifiers are similar to it.

The technical solutions in the embodiments of the present application will be clearly and completely described below with reference to the drawings in the embodiments of the present application, obviously, the described embodiments are only some of the embodiments of the present application, rather than all the embodiments. Based on the embodiments in the present application, all other embodiments obtained by those ordinarily skilled in the art without making creative efforts fall within the protection scope of the present application.

The embodiments of the present application provide a repetition determination method and a repetition determination apparatus, where the method and the apparatus are conceived based on the same application, since the method and apparatus have the similar problem-solving principles, the implementations of the apparatus and method may be referred to each other, and the repeated details will not be repeated.

Figure 1:
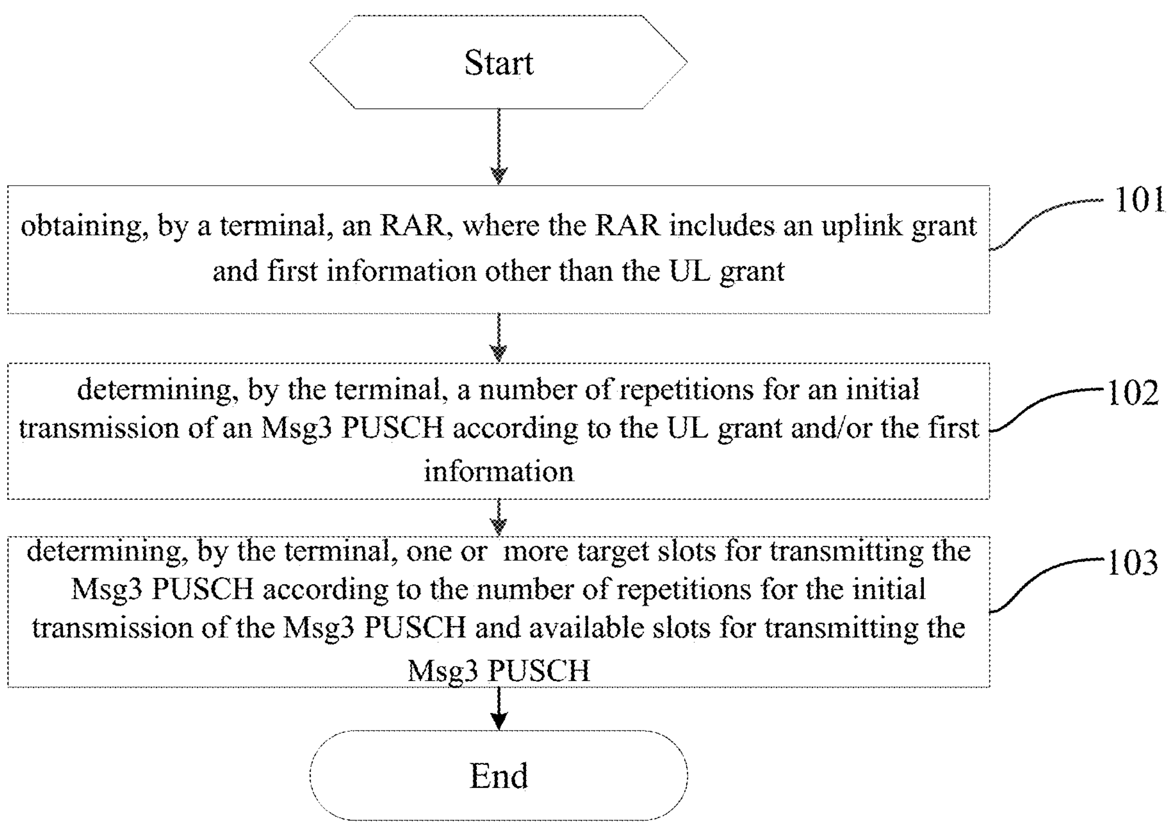
FIG. 1 is a first flowchart of a repetition determination method provided by an embodiment of the present disclosure.

As shown in FIG. 1, a flowchart of a repetition determination method provided by an embodiment of the present disclosure, which is applied to a terminal. The method includes step 101, step 102, and step 103.

In step 101: obtaining, by the terminal, a random access response (RAR), where the RAR includes an UL grant and first information other than the UL grant.

In step 102: determining, by the terminal, a number of repetitions for an initial transmission of an Msg3 PUSCH according to the UL grant and/or the first information.

Here, the terminal may determine the number of repetitions for the initial transmission of the Msg3 PUSCH according to the UL grant or the first information, or the UL grant and the first information. In this way, the flexibility of Msg3 PUSCH resource allocation can be improved.

In step 103: determining, by the terminal, one or more target slots for transmitting the Msg3 PUSCH according to the number of repetitions for the initial transmission of the Msg3 PUSCH and available slots for transmitting the Msg3 PUSCH.

In this step, the terminal can determine the one or more target slots for transmitting the Msg3 PUSCH based on the number of repetitions for the initial transmission of the Msg3 PUSCH and the available slots for transmitting the Msg3 PUSCH, thereby ensuring that the terminal can correctly determine the available uplink slots when transmitting the Msg3 PUSCH subsequently.

In the repetition determination method provided by the embodiment of the present disclosure, the terminal obtains the random access response (RAR), where the RAR includes the UL grant and the first information other than the UL grant; determines the number of repetitions for the initial transmission of the Msg3 PUSCH according to the UL grant and/or the first information; and determines one or more target slots for transmitting the Msg3 PUSCH according to the number of repetitions for the initial transmission of the Msg3 PUSCH and available slots for transmitting the Msg3 PUSCH. Therefore, the terminal can determine the number of repetitions for the initial transmission of the Msg3 PUSCH based on the UL grant and/or the first information other than the UL grant in the RAR. Furthermore, the terminal can also determine the available uplink slots for transmitting the Msg3 PUSCH, by which the flexibility of Msg3 PUSCH resource allocation can be improved while ensuring its transmission performance.

As an optional embodiment, the method of the embodiment of the present disclosure may also include: receiving a first indication signaling sent by a network side device, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

That is to say, the first indication signaling sent by the network side device indicates the terminal whether to determine the number of repetitions for the initial transmission of the Msg3 PUSCH according to the first information, or according to the UL grant, or according to both the first information and the UL grant.

Optionally, the first indication signaling is an indication signaling carried by SIB1. Specifically, the first indication signaling is indicated by N bits of information carried by SIB1, where N is an integer greater than or equal to 1.

It should be noted that there is no limitation on the definition of the first information and relevant information fields in the UL grant.

It is assumed that there is a terminal in the system that requires coverage enhancement. In order to ensure the reliability of its random access procedure, it needs to perform the repetition for the Msg3 PUSCH. The transmission of Msg3 PUSCH may be divided into two steps: indicating the number of repetitions and determining the time domain resource.

In one example, the network side device (such as a base station) indicates, through the indication signal carried by SIB1, the terminal to determine the number of repetitions for the initial transmission of the Msg3 PUSCH according to the information carried in the first information or to determine the number of repetitions for the initial transmission of the Msg3 PUSCH according to the information carried in the UL grant.

Specifically, the indication signaling carried by SIB1 includes 1-bit indication information, which indicates the method of determining the number of repetitions for the initial transmission of the Msg3 PUSCH. In this example, the 1-bit indication information has the following functions:

| Msg3 PUSCH repetition indication mode information field | Function |
|---|---|
| 0 | the terminal determines the number of repetitions for the initial transmission of the Msg3 PUSCH only according to the information carried in the first information |
| 1 | the terminal determines the number of repetitions for the initial transmission of the Msg3 PUSCH only according to the information carried in the UL grant |

If the indication information carried in SIB1 is state 0, the network side device indicates the number of repetitions for the initial transmission of the Msg3 PUSCH through the information carried in the first information; if the indication information carried in SIB1 is state 1, the network side device indicates the number of repetitions for the initial transmission of the Msg3 PUSCH through the information carried in the UL grant. This example does not place any restrictions on relevant information fields in the first information and relevant information fields in the UL grant.

It should be noted that since the terminal is in the initial random access stage, the cell-level time division duplex uplink and downlink configuration (TDD UL-DL configuration) sent by SIB1 can only be obtained at this time. However, for other terminals that have been in the connected state, the network side device may configure the terminal-dedicated (UE-dedicated) TDD UL-DL configuration for such terminals. In accordance with UE-dedicated TDD configuration, semi-static flexible symbol is configured as DL.

Here, of course, the network side device (such as the base station) may also indicate the terminal through the indication signaling carried by SIB1 to jointly determine the number of repetitions for the initial transmission of the Msg3 PUSCH according to the information carried in the first information and the information carried in the UL grant.

As an optional embodiment, in accordance with step 102 of the method provided by the embodiment of the present disclosure, the determining, by the terminal, the number of repetitions for the initial transmission of the Msg3 PUSCH according to the UL grant and the first information includes: determining the number of repetitions for the initial transmission of the Msg3 PUSCH according to one or more reserved bits in the first information and one or more reserved bits in the UL grant.

Here, the number of repetitions for the initial transmission of the Msg3 PUSCH is determined jointly according to the one or more reserved bits in the first information and the one or more reserved bits in the UL grant.

As another optional embodiment, in accordance with step 102 of the method provided by the embodiment of the present disclosure, the determining, by the terminal, the number of repetitions for the initial transmission of the Msg3 PUSCH according to the UL grant and the first information includes: determining the number of repetitions for the initial transmission of the Msg3 PUSCH according to a value range of a timing advance (TA) value carried in the first information and indication information carried in the UL grant.

Here, the number of repetitions for the initial transmission of the Msg3 PUSCH is determined according to the value range of the timing advance (TA) value (that is, the TA range) carried in the first information and the indication information carried in the UL grant.

Specifically, the determining the number of repetitions for the initial transmission of the Msg3 PUSCH according to the value range of the timing advance (TA) value carried in the first information and the indication information carried in the UL grant includes at least one of the following methods.

Alternatively, the determining the number of repetitions for the initial transmission of the Msg3 PUSCH according to the value range of the TA value carried in the first information and the indication information carried in the UL grant includes: determining, through the value range of TA value carried in the first information, a time domain resource allocation table used; indicating, through a time domain resource allocation (TDRA) indication field carried in the UL grant, time domain resource allocation information in the time domain resource allocation table; and determining the number of repetitions for the initial transmission of the Msg3 PUSCH according to the time domain resource allocation information.

Here, the TA command information field carried by the base station in the first information is used to indicate the corresponding TA value. Accordingly the terminal receives the TA command carried in the first information and determines the corresponding TA value. The base station and the terminal determine the relationship between the value range of the TA value and the time domain resource allocation table (TDRA table) through the predefined rule. For example, when the TA value is less than or equal to the first threshold value (the first threshold value is determined through a predefined method or a network-side configuration method (such as SIB1)), TDRA table #1 is used. When the TA value is greater than the first threshold value, TDRA table #2 is used. Further, the terminal and the base station determine the number of repetitions for the initial transmission of the Msg3 PUSCH based on the corresponding TDRA table.

Alternatively, the determining the number of repetitions for the initial transmission of the Msg3 PUSCH according to the value range of the TA value carried in the first information and the indication information carried in the UL grant includes: determining, through the value range of TA value carried in the first information, a value range of the number of repetitions for the initial transmission of the Msg3 PUSCH; indicating, through first indication information carried in the UL grant, the number of repetitions for the initial transmission of the Msg3 PUSCH within the value range of the number of repetitions.

Here, the TA command information field carried by the base station in the first information is used to indicate the corresponding TA value. Accordingly, the terminal receives the TA command carried in the first information and determines the corresponding TA value. The base station and the terminal determine the relationship between the value range of the TA value and the value range of the Msg3 PUSCH repetition number (that is, the value range of the number of repetitions for the initial transmission of the Msg3 PUSCH) through predefined or SIB1-notified rules. For example, when the TA value is less than or equal to the second threshold value (the second threshold value is determined through a predefined method or a network side configuration method (such as SIB1)), the value range of Msg3 PUSCH repetition number is {a1, a2, a3 . . . }. When the TA value is greater than the second threshold value, the value range of Msg3 PUSCH repetition number is {b1, b2, b3 . . . }. Further, the base station and the terminal determine the number of repetitions actually used, based on the corresponding value range of the Msg3 PUSCH repetition number, in accordance with the number of repetitions indication field carried in the UL grant.

Alternatively, the determining the number of repetitions for the initial transmission of the Msg3 PUSCH according to the value range of the TA value carried in the first information and the indication information carried in the UL grant includes: determining, through the value range of TA value carried in the first information, a scaling factor of the number of repetitions for the initial transmission of the Msg3 PUSCH; determining, through second indication information carried in the UL grant, a number of repetitions indicated by the UL grant; and determining the number of repetitions for the initial transmission of the Msg3 PUSCH according to the scaling factor and the number of repetitions indicated by the UL grant.

Here, the TA command information field carried by the base station in the first information is used to indicate the corresponding TA value. Accordingly, the terminal receives the TA command carried in the first information and determines the corresponding TA value. The base station and the terminal determine the relationship between the value range of the TA value and the scaling factor of the number of repetitions for the initial transmission of the Msg3 PUSCH (Msg3 PUSCH repetition number) through the predefined or SIB1-notified rules. For example, when the TA value is less than the third threshold value T, the scaling factor K=1. When the TA value is greater than or equal to T, the scaling factor K=2. Further, the number of repetitions for the initial transmission of the Msg3 PUSCH is determined as K*R through the scaling factor K and the number of repetitions R indicated by the related indication information carried in the UL grant.

As an optional embodiment, the method of the embodiment of the present disclosure may also include: determining the available slots for transmitting the Msg3 PUSCH according to a predefined rule or a network indication.

Optionally, in this step, the determining the available slots for transmitting the Msg3 PUSCH according to the predefined rule includes one of the following methods: only using semi-static uplink slots as the available slots for transmitting the Msg3 PUSCH; or, using semi-static uplink slots and semi-static flexible slots as the available slots for transmitting the Msg3 PUSCH. Here the semi-static flexible slots do not include a semi-static flexible symbol configured to transmit at least one of the following channels or pieces of information: synchronization signal block (SSB); control resource set (CORESET) #0; or type0 common search space (CSS).

Here, after the terminal obtains the number of repetitions for the initial transmission of the Msg3 PUSCH through step 102 of the method provided by the embodiment of the present disclosure, the terminal may determine the available slots for transmitting the Msg3 PUSCH through one of the above-mentioned methods.

It should be noted that in the case of semi-static uplink slots and semi-static flexible slots as available slots for transmitting the Msg3 PUSCH, on all the symbols on which the Msg3 PUSCH is transmitted, the base station will not transmit any UE-dedicated downlink data or signals on all the above-mentioned symbols on which the Msg3 PUSCH is transmitted. Moreover, the terminal does not expect the base station to transmit any UE-dedicated downlink data or signals, by which the conflict can be prevented between some repetitions in the terminal that need to perform the repetition of Msg3 PUSCH and the downlink transmission of other terminals from resulting in the transmission failure, and potential damage to the transmission performance of Msg3 PUSCH can be avoided.

On the one hand, after the terminal obtains the number of repetitions for the initial transmission of the Msg3 PUSCH, the terminal only uses the semi-static uplink slots as the available slots for transmitting the Msg3 PUSCH. A specific example will be described below.

Figure 2:
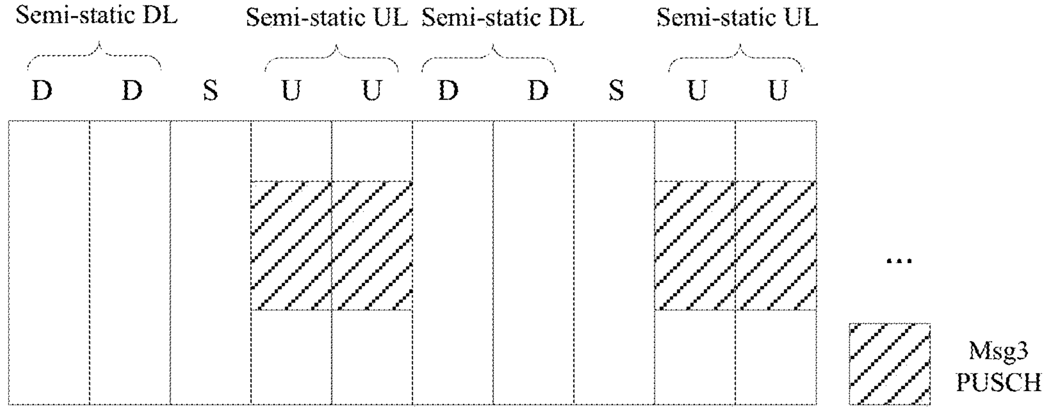
FIG. 2 is a first schematic view of an example of applying the repetition determination method according to an embodiment of the present disclosure.

As shown in FIG. 2, it is assumed that the TDD UL-DL configuration structure notified by SIB1 is DDSUUDDSUU. Additionally, SIB1 indicates, through the Msg3 PUSCH repetition indication mode information field, the number of repetitions for the initial transmission of the Msg3 PUSCH indicated by the first information or UL grant. In this example, it is assumed that the base station indicates the number of repetitions for the initial transmission of the Msg3 PUSCH through the relevant information in the UL grant, and assumed that the number of repetitions is 4, since the available slots for transmitting the Msg3 PUSCH are only semi-static uplink slot, therefore, the one or more target slots for transmitting the Msg3 PUSCH is determined based on the number of repetitions and the semi-static uplink slots (the diagram parts indicated by oblique lines in the figure), that is, the slots represented by the four diagram parts indicated by oblique lines in the figure, that is, the semi-static uplink slots.

On the other hand, after the terminal obtains the number of repetitions for the initial transmission of the Msg3 PUSCH, the semi-static uplink slots and the semi-static flexible slots are used as available slots for transmitting the Msg3 PUSCH. A specific example will be described below.

Figure 3:
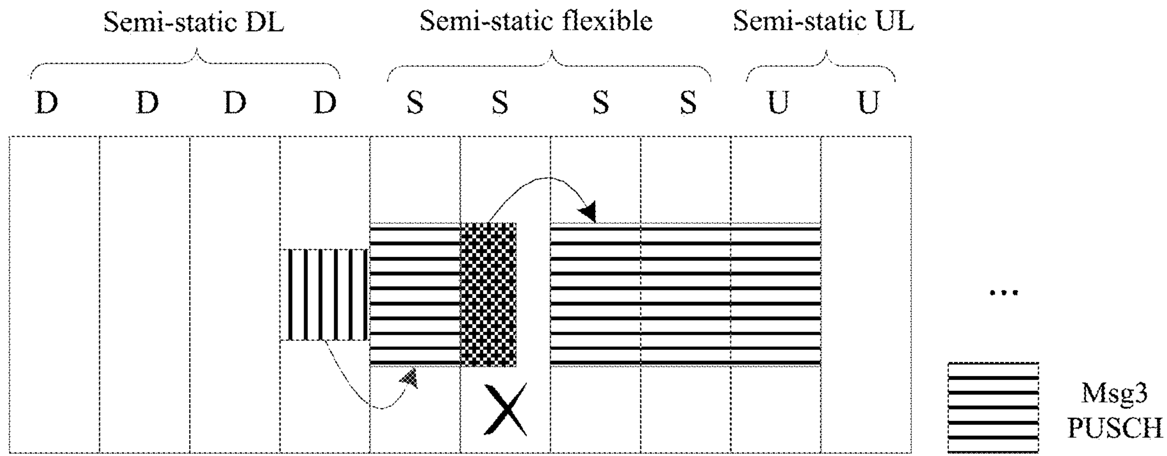
FIG. 3 is a second schematic view of an example of applying the repetition determination method according to an embodiment of the present disclosure.

As shown in FIG. 3, it is assumed that the TDD UL-DL configuration structure notified by SIB1 is DDDDSSSSUU. Additionally, SIB1 indicates, through the Msg3 PUSCH repetition indication mode information field, the number of repetitions for the initial transmission of the Msg3 PUSCH indicated by the first information or the UL grant. In this example, it is assumed that the base station indicates the number of repetitions for the initial transmission of the Msg3 PUSCH through the relevant information in the UL grant, and assumed that the number of repetitions is 4. It is assumed that the terminal detects and receives the UL grant in the fourth DL slot, and the time domain resource indication field carried in the UL grant indicates K2=1, that is, the Msg3 PUSCH is transmitted in the first slot immediately after the slot in which the UL grant is transmitted. It is assumed that the network side sends Type0-CSS in slot #5, then the slots configured to send the Msg3 PUSCH are the slots represented by the four diagram parts indicated by horizontal lines as shown in FIG. 3.

In this example, the Msg3 PUSCH can only be transmitted on semi-static UL and semi-static flexible symbols that are not used to transmit SSB/CORESET #0/Typ0 CSS. When the terminal encounters a symbol or slot that cannot send the Msg3 PUSCH, the repetition of the Msg3 PUSCH is delayed somewhat.

For semi-static flexible symbols that do not transmit SSB/CORESET #0/Typ0 CSS, the terminal does not expect the base station to schedule any downlink transmission on these symbols. When the base station configures the UE-dedicated TDD UL DL configuration for the terminal, the base station will not set these symbols as DL, nor schedule the downlink transmission of other terminals, by which the conflict can be prevented between some repetitions in the terminal that need to perform the repetition of Msg3 PUSCH and the downlink transmission of other terminals from resulting in the transmission failure, and potential damage to the transmission performance of Msg3 PUSCH can be avoided.

Alternatively, in this step, the determining the available slots for transmitting the Msg3 PUSCH according to the network indication includes: receiving second indication signaling sent by a network side device, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: SSB; CORESET #0; or type0 CSS.

Optionally, in a case that the available slots for transmitting the Msg3 PUSCH include the semi-static flexible slots, then the terminal does not expect the network side device to transmit downlink data or configure downlink symbol on the semi-static flexible symbol occupied by the Msg3 PUSCH.

Optionally, the terminal may determine the corresponding method of determining the available slots for transmitting the Msg3 PUSCH through the indication of the relevant information carried by SIB1 (i.e., the second indication signaling) sent by the network side device.

As an optional embodiment, after determining the one or more target slots for transmitting the Msg3 PUSCH, the method in the embodiment of the present disclosure may further include: sending the Msg3 PUSCH on the determined one or more target slots.

In the repetition determination method provided by the embodiment of the present disclosure, the terminal obtains the random access response (RAR), where the RAR includes the UL grant and the first information other than the UL grant; determines the number of repetitions for the initial transmission of the Msg3 PUSCH according to the UL grant and/or the first information; and determines one or more target slots for transmitting the Msg3 PUSCH according to the number of repetitions for the initial transmission of the Msg3 PUSCH and available slots for transmitting the Msg3 PUSCH. Therefore, the terminal can determine the number of repetitions for the initial transmission of the Msg3 PUSCH based on the UL grant and/or the first information other than the UL grant in the RAR. Furthermore, the terminal can also determine the available uplink slots for transmitting the Msg3 PUSCH, by which the flexibility of Msg3 PUSCH resource allocation can be improved while ensuring its transmission performance.

Figure 4:
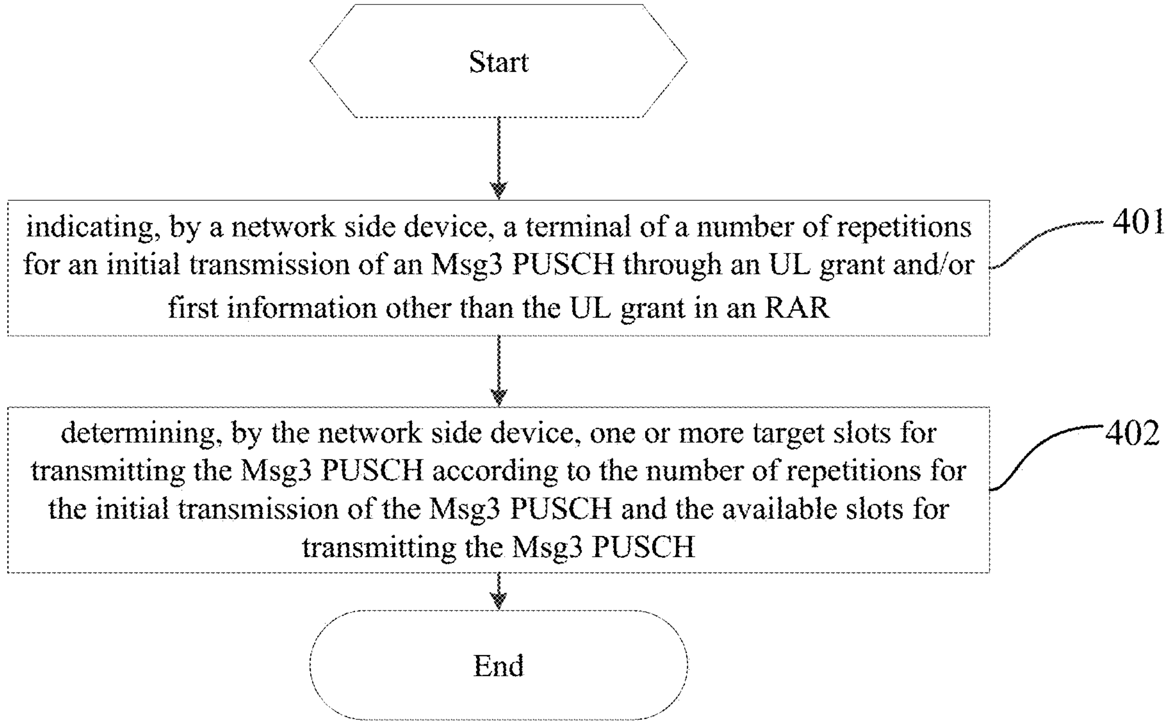
FIG. 4 is a second flowchart of the repetition determination method provided by an embodiment of the present disclosure.

As shown in FIG. 4, a flowchart of a repetition determination method provided by an embodiment of the present disclosure, which is performed by a terminal. The method includes step 401 and step 402.

In step 401, indicating, by a network side device, a terminal of a number of repetitions for an initial transmission of an Msg3 PUSCH through an UL grant and/or first information other than the UL grant in a random access response (RAR).

Here, the network side device may indicate the terminal of the number of repetitions for the initial transmission of the Msg3 PUSCH through the UL grant or through the first information or through the UL grant and the first information, by which the flexibility of Msg3 PUSCH resource allocation can be improved.

In step 402, determining, by the network side device, one or more target slots for transmitting the Msg3 PUSCH according to the number of repetitions for the initial transmission of the Msg3 PUSCH and the available slots for transmitting the Msg3 PUSCH.

In this step, the network side device can determine the one or more target slots for transmitting the Msg3 PUSCH based on the number of repetitions for the initial transmission of the Msg3 PUSCH and the available slots for transmitting the Msg3 PUSCH, thereby ensuring that the network side device can receive the Msg3 PUSCH at the correct uplink slot(s).

In the repetition determination method provided by the embodiment of the present disclosure, the network side device indicates a terminal of a number of repetitions for an initial transmission of an Msg3 PUSCH through an UL grant and/or first information other than the UL grant in a random access response (RAR); and determines one or more target slots for transmitting the Msg3 PUSCH according to the number of repetitions for the initial transmission of the Msg3 PUSCH and the available slots for transmitting the Msg3 PUSCH. Therefore, the network side device can determine the number of repetitions for the initial transmission of the Msg3 PUSCH based on the UL grant and/or the first information other than the UL grant in the RAR. Furthermore, the terminal can also determine the available uplink slots for transmitting the Msg3 PUSCH, by which the flexibility of Msg3 PUSCH resource allocation can be improved while ensuring its transmission performance.

As an optional embodiment, the method of the embodiment of the present disclosure may also include: sending first indication signaling to the terminal, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

That is to say, the network side device sends the first indication signaling to the terminal, which indicates the terminal whether to determine the number of repetitions for the initial transmission of the Msg3 PUSCH according to the first information, or the UL grant, or the first information and the UL grant.

Optionally, the first indication signaling is the indication signaling carried by SIB1. Specifically, the first indication signaling is indicated by N bits of information carried by SIB1, where N is an integer greater than or equal to 1.

It should be noted that there is no limitation on the definition of relevant information field(s) in the UL grant and the first information.

As an optional embodiment, in step 401, the indicating, by the network side device, the terminal of the number of repetitions for the initial transmission of the Msg3 PUSCH through the UL grant and/or first information other than the UL grant in the random access response (RAR) may specially include: indicating, through one or more reserved bits in the first information and one or more reserved bits in the UL grant, the terminal of the number of repetitions for the initial transmission of the Msg3 PUSCH.

As another optional embodiment, in step 401, the indicating, by the network side device, the terminal of the number of repetitions for the initial transmission of the Msg3 PUSCH through the UL grant and/or first information other than the UL grant in the random access response (RAR) may specially include: indicating the terminal of the number of repetitions for the initial transmission of the Msg3 PUSCH according to a value range of a timing advance (TA) value carried in the first information and indication information carried in the UL grant.

Specifically, the indicating the terminal of the number of repetitions for the initial transmission of the Msg3 PUSCH according to the value range of the timing advance (TA) value carried in the first information and indication information carried in the UL grant includes at least one of the following methods:

- determining, through the value range of TA value carried in the first information, a time domain resource allocation table used by the terminal; indicating, through a time domain resource allocation (TDRA) indication field carried in the UL grant, time domain resource allocation information in the time domain resource allocation table; and indicating the terminal of the number of repetitions for the initial transmission of the Msg3 PUSCH according to the time domain resource allocation information;
- determining, through the value range of TA value carried in the first information, a value range of the number of repetitions for the initial transmission of the Msg3 PUSCH for the terminal; indicating, through first indication information carried in the UL grant, the number of repetitions for the initial transmission of the Msg3 PUSCH within the value range of the number of repetitions; or,
- determining, through the value range of TA value carried in the first information, a scaling factor of the number of repetitions for the initial transmission of the Msg3 PUSCH for the terminal; determining, through second indication information carried in the UL grant, a number of repetitions indicated by the UL grant; and determining the number of repetitions for the initial transmission of the Msg3 PUSCH for the terminal according to the scaling factor and the number of repetitions indicated by the UL grant.

As an optional embodiment, the method of the embodiment of the present disclosure may also include: determining the available slots for transmitting the Msg3 PUSCH according to a predefined rule.

Specifically, the determining the available slots for transmitting the Msg3 PUSCH according to the predefined rule includes one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

As an optional embodiment, the method of the embodiment of the present disclosure may also include: sending second indication signaling to the terminal, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: SSB; CORESET #0; or type0 CSS.

Optionally, in a case that the available slots for transmitting the Msg3 PUSCH include the semi-static flexible slots, then the network side device does not transmit downlink data or configure downlink symbol on the semi-static flexible symbol occupied by the Msg3 PUSCH.

In the repetition determination method provided by the embodiment of the present disclosure, the network side device indicates a terminal of a number of repetitions for an initial transmission of an Msg3 PUSCH through an UL grant and/or first information other than the UL grant in a random access response (RAR); and determines one or more target slots for transmitting the Msg3 PUSCH according to the number of repetitions for the initial transmission of the Msg3 PUSCH and the available slots for transmitting the Msg3 PUSCH. Therefore, the network side device can determine the number of repetitions for the initial transmission of the Msg3 PUSCH based on the UL grant and/or the first information other than the UL grant in the RAR. Furthermore, the terminal can also determine the available uplink slots for transmitting the Msg3 PUSCH, by which the flexibility of Msg3 PUSCH resource allocation can be improved while ensuring its transmission performance.

Figure 5:
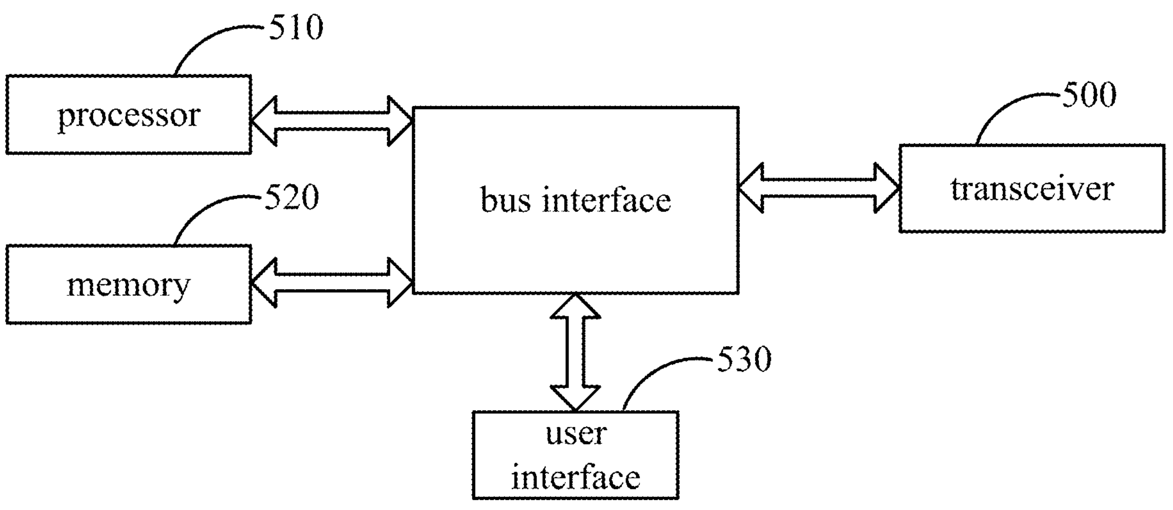
FIG. 5 is a structural block view of a terminal according to an embodiment of the present disclosure.

As shown in FIG. 5, the embodiment of the present disclosure also provides a terminal, which includes: a memory 520, a transceiver 500, and a processor 510, where the memory 520 is used to store program instructions, the transceiver 500 is used to send and receive data under the control of the processor 510, and the processor 510 is used to read the program instructions in the memory 520 and perform the following operations of: obtaining a random access response (RAR), wherein the RAR comprises an UL grant and first information other than the UL grant; determining a number of repetitions for an initial transmission of an Msg3 PUSCH according to the UL grant and/or the first information; and determining one or more target slots for transmitting the Msg3 PUSCH according to the number of repetitions for the initial transmission of the Msg3 PUSCH and available slots for transmitting the Msg3 PUSCH.

In FIG. 5, the bus architecture may include any quantity of interconnected buses and bridges, specifically one or more processors represented by the processor 510 and various circuits of the memory represented by memory 520 are linked together. The bus architecture may also link together various other circuits such as peripherals, voltage regulators, and power management circuits, which are all well known in the art and therefore will not be described further herein. The bus interface provides the interface. The transceiver 500 may be a plurality of elements, including a transmitter and a receiver, which provides a unit for communicating with various other apparatuses over transmission media, these transmission media includes wireless channels, wired channels, optical cables and other transmission media. For different user equipment, the user interface 530 may also be an interface capable of externally and internally connecting the required equipment, the connected equipments include but are not limited to keypads, monitors, speakers, microphones, joysticks, etc.

The processor 510 is responsible for managing the bus architecture and general processing, and the memory 520 may store data used by the processor 510 when performing operations.

Optionally, the processor 510 may be a CPU (Central Processing Unit), ASIC (Application Specific Integrated Circuit), FPGA (Field-Programmable Gate Array) or CPLD (Complex Programmable Logic Device), the processor 510 may also adopt a multi-core architecture.

The processor 510 is used to execute any of the methods provided by the embodiments of the present application according to the obtained executable instructions by calling the program instructions stored in the memory. The processor 510 and the memory 520 may also be physically separated.

Optionally, the transceiver 500 is also used to: receive a first indication signaling sent by a network side device, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

Optionally, the processor 510 is used to read the program instructions in the memory and perform the following operations of: determining the number of repetitions for the initial transmission of the Msg3 PUSCH according to one or more reserved bits in the first information and one or more reserved bits in the UL grant.

Optionally, the processor 510 is used to read the program instructions in the memory and perform the following operations of: determining the number of repetitions for the initial transmission of the Msg3 PUSCH according to a value range of a timing advance (TA) value carried in the first information and indication information carried in the UL grant.

Optionally, the processor 510 is used to read the program instructions in the memory and perform at least one of the following operations of:

determining, through the value range of TA value carried in the first information, a time domain resource allocation table used; indicating, through a time domain resource allocation (TDRA) indication field carried in the UL grant, time domain resource allocation information in the time domain resource allocation table; and determining the number of repetitions for the initial transmission of the Msg3 PUSCH according to the time domain resource allocation information;

determining, through the value range of TA value carried in the first information, a value range of the number of repetitions for the initial transmission of the Msg3 PUSCH; indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH; determining, through second indication information carried in the UL grant, a number of repetitions indicated by the UL grant; and determining the number of repetitions for the initial transmission of the Msg3 PUSCH according to the scaling factor and the number of repetitions indicated by the UL grant.

Optionally, the processor 510 is used to read the program instructions in the memory and perform the following operations of: determining the available slots for transmitting the Msg3 PUSCH according to a predefined rule or a network indication.

Optionally, the processor 510 is used to read the program instructions in the memory and perform at least one of the following operations of: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

Optionally, the transceiver 500 is also used to: receive second indication signaling sent by a network side device, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

Optionally, in a case that the available slots for transmitting the Msg3 PUSCH include the semi-static flexible slots, then the terminal does not expect the network side device to transmit downlink data or configure downlink symbol on the semi-static flexible symbol occupied by the Msg3 PUSCH.

In the terminal provided by the embodiment of the present disclosure, the terminal obtains the random access response (RAR), where the RAR includes the UL grant and the first information other than the UL grant; determines the number of repetitions for the initial transmission of the Msg3 PUSCH according to the UL grant and/or the first information; and determines one or more target slots for transmitting the Msg3 PUSCH according to the number of repetitions for the initial transmission of the Msg3 PUSCH and available slots for transmitting the Msg3 PUSCH. Therefore, the terminal can determine the number of repetitions for the initial transmission of the Msg3 PUSCH based on the UL grant and/or the first information other than the UL grant in the RAR. Furthermore, the terminal can also determine the available uplink slots for transmitting the Msg3 PUSCH, by which the flexibility of Msg3 PUSCH resource allocation can be improved while ensuring its transmission performance.

Figure 6:
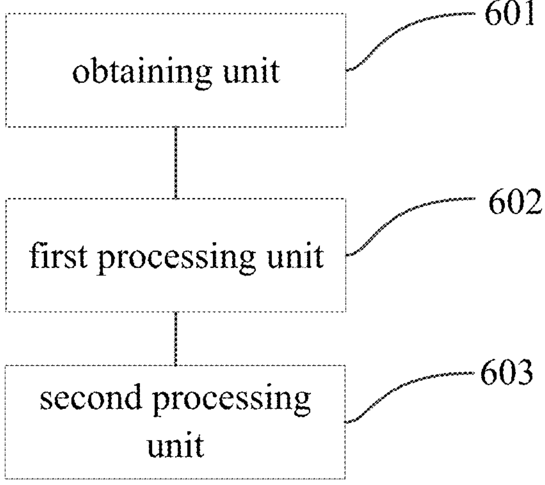
FIG. 6 is a schematic module view of the terminal according to an embodiment of the present disclosure.

As shown in FIG. 6, the embodiment of the present disclosure also provides a repetition determination apparatus, which includes: an obtaining unit 601, used to obtain a random access response (RAR), where the RAR includes an UL grant and first information other than the UL grant; a first processing unit 602, used to determine a number of repetitions for an initial transmission of an Msg3 PUSCH according to the UL grant and/or the first information; and a second processing unit 603, used to determine one or more target slots for transmitting the Msg3 PUSCH according to the number of repetitions for the initial transmission of the Msg3 PUSCH and available slots for transmitting the Msg3 PUSCH.

Optionally, the repetition determination apparatus provided by the embodiment of the present disclosure further includes: a first receiving unit, used to receive a first indication signaling sent by a network side device, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

Optionally, the first processing unit 602 is specifically used to: determine the number of repetitions for the initial transmission of the Msg3 PUSCH according to one or more reserved bits in the first information and one or more reserved bits in the UL grant.

Optionally, the first processing unit 602 is specifically used to: determine the number of repetitions for the initial transmission of the Msg3 PUSCH according to a value range of a timing advance (TA) value carried in the first information and indication information carried in the UL grant.

Optionally, the first processing unit 602 is specifically used to perform at least one of the following:

determining, through the value range of TA value carried in the first information, a time domain resource allocation table used; indicating, through a time domain resource allocation (TDRA) indication field carried in the UL grant, time domain resource allocation information in the time domain resource allocation table; and determining the number of repetitions for the initial transmission of the Msg3 PUSCH according to the time domain resource allocation information;

determining, through the value range of TA value carried in the first information, a value range of the number of repetitions for the initial transmission of the Msg3 PUSCH; indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH; determining, through second indication information carried in the UL grant, a number of repetitions indicated by the UL grant; and determining the number of repetitions for the initial transmission of the Msg3 PUSCH according to the scaling factor and the number of repetitions indicated by the UL grant.

Optionally, the repetition determination apparatus provided by the embodiment of the present disclosure also includes: a third processing unit, used to determine the available slots for transmitting the Msg3 PUSCH according to a predefined rule or a network indication.

Optionally, the third processing unit is specifically used to perform at least one of the following of: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

Optionally, the third processing unit is specifically used to: receive second indication signaling sent by a network side device, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: SSB; CORESET #0; or type0 CSS.

Optionally, in a case that the available slots for transmitting the Msg3 PUSCH include the semi-static flexible slots, then the terminal does not expect the network side device to transmit downlink data or configure downlink symbol on the semi-static flexible symbol occupied by the Msg3 PUSCH.

The repetition determination apparatus provided by the embodiment of the present disclosure obtains the random access response (RAR), where the RAR includes the UL grant and the first information other than the UL grant; determines the number of repetitions for the initial transmission of the Msg3 PUSCH according to the UL grant and/or the first information; and determines one or more target slots for transmitting the Msg3 PUSCH according to the number of repetitions for the initial transmission of the Msg3 PUSCH and available slots for transmitting the Msg3 PUSCH. Therefore, the repetition determination apparatus can determine the number of repetitions for the initial transmission of the Msg3 PUSCH based on the UL grant and/or the first information other than the UL grant in the RAR. Furthermore, the terminal can also determine the available uplink slots for transmitting the Msg3 PUSCH, by which the flexibility of Msg3 PUSCH resource allocation can be improved while ensuring its transmission performance.

It should be noted that the division of units in the embodiment of the present application is schematic and is only a logical function division. In actual implementation, there may be other division methods. In addition, each functional unit in each embodiment of the present application may be integrated into one processing unit, each unit can exist physically alone, or two or more units may be integrated into one unit. The above-mentioned integrated units may be implemented in the form of hardware or software functional units.

If the integrated unit is implemented in the form of a software functional unit and sold or used as an independent product, it may be stored in a processor-readable storage medium. Based on this understanding, the technical solution of the present application or the part that contributes to the relevant technology, or all or part of the technical solution may be embodied in the form of a software product, and the computer software product is stored in a storage medium, which includes several instructions to cause a computer device (which can be a personal computer, a server, or a network device, etc.) or a processor to execute all or part of the steps of the methods described in various embodiments of the present application. The aforementioned storage media include: U disk, mobile hard disk, read-only memory (Read-Only Memory, ROM), random access memory (Random Access Memory, RAM), magnetic disk or optical disk and other media that can store program code.

It should be noted here that the above-mentioned apparatus provided by the embodiment of the present disclosure can implement all the method steps implemented by the above-mentioned method embodiment, and can achieve the same technical effect, the parts and beneficial effects in this embodiment that are the same as those in the method embodiment will not be described in detail here.

In some embodiments of the present disclosure, a processor-readable storage medium is also provided, the processor-readable storage medium is stored with program instructions, and the program instructions are used to cause the processor to perform the following steps of: obtaining a random access response (RAR), where the RAR includes an UL grant and first information other than the UL grant; determining a number of repetitions for an initial transmission of an Msg3 PUSCH according to the UL grant and/or the first information; and determining one or more target slots for transmitting the Msg3 PUSCH according to the number of repetitions for the initial transmission of the Msg3 PUSCH and available slots for transmitting the Msg3 PUSCH.

When the program is executed by the processor, all the implementation manners in the above-mentioned method embodiments applied to the terminal side as shown in FIG. 1 can be implemented. To avoid duplication, the repeated details will not be described again here.

Figure 7:
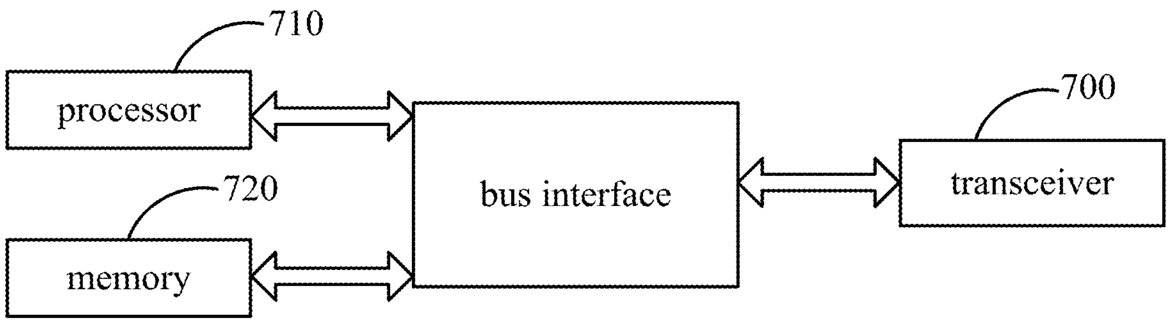
FIG. 7 is a structural block view of a network device according to an embodiment of the present disclosure.

As shown in FIG. 7, the embodiment of the present disclosure also provides a network side device, which includes: a memory 720, a transceiver 700, and a processor 710, where the memory 720 is used to store computer program; the transceiver 700 is used to send and receive data under the control of the processor 710, and the processor 710 is used to read the computer program in the memory 720 and perform the following operations of: indicating, through an UL grant and/or first information other than the UL grant in a random access response (RAR), a terminal of a number of repetitions for an initial transmission of an Msg3 PUSCH; and determining one or more target slots for transmitting the Msg3 PUSCH according to the number of repetitions for the initial transmission of the Msg3 PUSCH and the available slots for transmitting the Msg3 PUSCH.

In FIG. 7, the bus architecture may include any quantity of interconnected buses and bridges, specifically one or more processors represented by processor 710 and various circuits of the memory represented by memory 720 are linked together. The bus architecture can also link together various other circuits such as peripherals, voltage regulators, and power management circuits, which are all well known in the art and therefore will not be described further herein. The bus interface provides the interface. The transceiver 700 may be a plurality of components, including a transmitter and a receiver, which provide a unit for communicating with various other apparatuses over transmission media, these transmission media include wireless channels, wired channels, optical cables, and other transmission media. The processor 710 is responsible for managing the bus architecture and general processing, and the memory 720 can store data used by the processor 710 when performing operations.

The processor 710 may be a central processing unit (CPU), an application specific integrated circuit (Application Specific Integrated Circuit, ASIC), a field programmable gate array (Field-Programmable Gate Array, FPGA) or a complex programmable logic device (Complex Programmable Logic Device, CPLD), the processor may also adopt a multi-core architecture.

Optionally, the transceiver 700 is also used to: send first indication signaling to the terminal, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

Optionally, processor 710 is used to read the computer program in the memory and perform the following operations of: indicating the terminal of the number of repetitions for the initial transmission of the Msg3 PUSCH according to a value range of a timing advance (TA) value carried in the first information and indication information carried in the UL grant.

Optionally, the processor 710 is used to read the program instructions in the memory and perform at least one of the following operations of:

- determining, through the value range of TA value carried in the first information, a time domain resource allocation table used by the terminal; indicating, through a time domain resource allocation (TDRA) indication field carried in the UL grant, time domain resource allocation information in the time domain resource allocation table; and indicating the terminal of the number of repetitions for the initial transmission of the Msg3 PUSCH according to the time domain resource allocation information;
- determining, through the value range of TA value carried in the first information, a value range of the number of repetitions for the initial transmission of the Msg3 PUSCH for the terminal, indicating, through first indication information carried in the UL grant, the number of repetitions for the initial transmission of the Msg3 PUSCH within the value range of the number of repetitions; or,
- determining, through the value range of TA value carried in the first information, a scaling factor of the number of repetitions for the initial transmission of the Msg3 PUSCH for the terminal; determining, through second indication information carried in the UL grant, a number of repetitions indicated by the UL grant; and determining the number of repetitions for the initial transmission of the Msg3 PUSCH for the terminal according to the scaling factor and the number of repetitions indicated by the UL grant.

Optionally, the processor 710 is used to read the program instructions in the memory and perform the following operations of: determining the available slots for transmitting the Msg3 PUSCH according to a predefined rule.

Optionally, the processor 710 is used to read the program instructions in the memory and perform at least one of the following operations of: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

Optionally, the transceiver 700 is also used to: send second indication signaling to the terminal, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: SSB; CORESET #0; or type0 CSS.

Optionally, in a case that the available slots for transmitting the Msg3 PUSCH include the semi-static flexible slots, then the network side device does not transmit downlink data or configure downlink symbol on the semi-static flexible symbol occupied by the Msg3 PUSCH.

In the network side device provided by the embodiment of the present disclosure, the network side device indicates a terminal of a number of repetitions for an initial transmission of an Msg3 PUSCH through an UL grant and/or first information other than the UL grant in a random access response (RAR); and determines one or more target slots for transmitting the Msg3 PUSCH according to the number of repetitions for the initial transmission of the Msg3 PUSCH and the available slots for transmitting the Msg3 PUSCH. Therefore, the network side device can determine the number of repetitions for the initial transmission of the Msg3 PUSCH based on the UL grant and/or the first information other than the UL grant in the RAR. Furthermore, the terminal can also determine the available uplink slots for transmitting the Msg3 PUSCH, by which the flexibility of Msg3 PUSCH resource allocation can be improved while ensuring its transmission performance.

Figure 8:
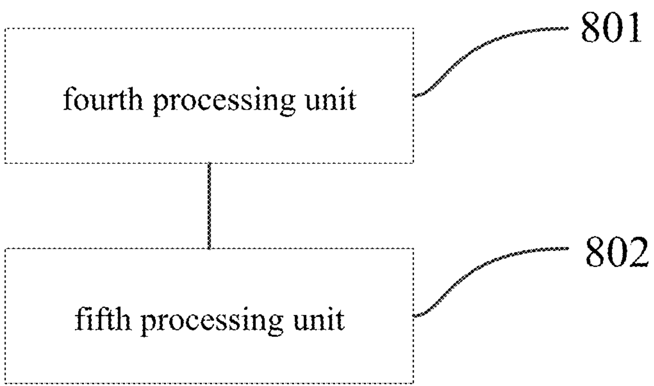
FIG. 8 is a schematic module view of the network device according to an embodiment of the present disclosure.

As shown in FIG. 8, an embodiment of the present disclosure also provides a repetition determination apparatus, which includes: a fourth processing unit 801, used to indicate, through an UL grant and/or first information other than the UL grant in a random access response (RAR), a terminal of a number of repetitions for an initial transmission of an Msg3 PUSCH; and a fifth processing unit 802, used to determine one or more target slots for transmitting the Msg3 PUSCH according to the number of repetitions for the initial transmission of the Msg3 PUSCH and available slots for transmitting the Msg3 PUSCH.

Optionally, the repetition determination apparatus provided by the embodiment of the present disclosure further includes: a sending unit, used to send first indication signaling to the terminal, where the first indication signaling is used to indicate any of the following: indicating the terminal to determine the number of repetitions for the initial transmission of the Msg3 PUSCH according to the first information; indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant.

Optionally, the fourth processing unit 801 is specifically used to: indicate, through one or more reserved bits in the first information and one or more reserved bits in the UL grant, the terminal of the number of repetitions for the initial transmission of the Msg3 PUSCH.

Optionally, the fourth processing unit 801 is specifically used to: indicate the terminal of the number of repetitions for the initial transmission of the Msg3 PUSCH according to a value range of a timing advance (TA) value carried in the first information and indication information carried in the UL grant.

Optionally, the fourth processing unit 801 is specifically used to perform at least one of the following:

determining, through the value range of TA value carried in the first information, a time domain resource allocation table used by the terminal; indicating, through a time domain resource allocation (TDRA) indication field carried in the UL grant, time domain resource allocation information in the time domain resource allocation table; and indicating the terminal of the number of repetitions for the initial transmission of the Msg3 PUSCH according to the time domain resource allocation information;

determining, through the value range of TA value carried in the first information, a value range of the number of repetitions for the initial transmission of the Msg3 PUSCH for the terminal, indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH for the terminal; determining, through second indication information carried in the UL grant, a number of repetitions indicated by the UL grant; and determining the number of repetitions for the initial transmission of the Msg3 PUSCH for the terminal according to the scaling factor and the number of repetitions indicated by the UL grant.

Optionally, the repetition determination apparatus provided by the embodiment of the present disclosure also includes: a sixth processing unit, used to determine the available slots for transmitting the Msg3 PUSCH according to a predefined rule.

Optionally, the sixth processing unit is specifically used to perform one of the following of: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: synchronization signal block (SSB); control resource set (CORESET) #0; or type0 common search space (CSS).

Optionally, the repetition determination apparatus provided by the embodiment of the present disclosure also includes: a second sending unit, used to send second indication signaling to the terminal, where the second indication signaling is used to indicate the terminal to determine the available slots for transmitting the Msg3 PUSCH according to one of the following methods: only using semi-static uplink slots as the available slots for transmitting the Msg3 PUSCH; or, using semi-static uplink slots and semi-static flexible slots as the available slots for transmitting the Msg3 PUSCH, where the semi-static flexible slots do not include a semi-static flexible symbol configured to transmit at least one of the following channels or pieces of information: SSB; CORESET #0; or type0 CSS.

Optionally, in a case that the available slots for transmitting the Msg3 PUSCH include the semi-static flexible slots, then the network side device does not transmit downlink data or configure downlink symbol on the semi-static flexible symbol occupied by the Msg3 PUSCH.

The repetition determination apparatus provided by the embodiment of the present disclosure indicates a terminal of a number of repetitions for an initial transmission of an Msg3 PUSCH through an UL grant and/or first information other than the UL grant in a random access response (RAR); and determines one or more target slots for transmitting the Msg3 PUSCH according to the number of repetitions for the initial transmission of the Msg3 PUSCH and the available slots for transmitting the Msg3 PUSCH. Therefore, the repetition determination apparatus can determine the number of repetitions for the initial transmission of the Msg3 PUSCH based on the UL grant and/or the first information other than the UL grant in the RAR. Furthermore, the terminal can also determine the available uplink slots for transmitting the Msg3 PUSCH, by which the flexibility of Msg3 PUSCH resource allocation can be improved while ensuring its transmission performance.

It should be noted that the division of units in the embodiment of the present application is schematic and is only a logical function division. In actual implementation, there may be other division methods. In addition, each functional unit in each embodiment of the present application can be integrated into one processing unit, each unit can exist physically alone, or two or more units can be integrated into one unit. The above-mentioned integrated units can be implemented in the form of hardware or software functional units.

If the integrated unit is implemented in the form of a software functional unit and sold or used as an independent product, it may be stored in a processor-readable storage medium. Based on this understanding, the technical solution of the present application or the part that contributes to the relevant technology, or all or part of the technical solution may be embodied in the form of a software product, and the computer software product is stored in a storage medium, which includes several instructions to cause a computer device (which can be a personal computer, a server, or a network device, etc.) or a processor to execute all or part of the steps of the methods described in various embodiments of the present application. The aforementioned storage media include: U disk, mobile hard disk, read-only memory (Read-Only Memory, ROM), random access memory (Random Access Memory, RAM), magnetic disk or optical disk and other media that can store program code.

It should be noted here that the above-mentioned apparatus provided by the embodiment of the present disclosure can implement all the method steps implemented by the above-mentioned method embodiment, and can achieve the same technical effect. The parts and beneficial effects in this embodiment that are the same as those in the method embodiment will not be described in detail here.

In some embodiments of the present disclosure, a processor-readable storage medium is also provided, the processor-readable storage medium is stored with program instructions, and the program instructions are configured to cause the processor to perform the following steps: indicating, through an UL grant and/or first information other than the UL grant in a random access response (RAR), a terminal of a number of repetitions for an initial transmission of an Msg3 PUSCH; and determining one or more target slots for transmitting the Msg3 PUSCH according to the number of repetitions for the initial transmission of the Msg3 PUSCH and the available slots for transmitting the Msg3 PUSCH.

When the program is executed by the processor, all the implementation methods in the above-mentioned method embodiment applied to the network side device side as shown in FIG. 4 can be implemented. To avoid duplication, the repeated details will not be described again here.

The technical solutions provided by the embodiments of the present application can be applied to a variety of systems, especially 5G systems. For example, applicable systems may be Global System of Mobile communication (GSM) system, Code Division Multiple Access (CDMA) system, Wideband Code Division Multiple Access (WCDMA) general packet radio service (GPRS) system, Long Term Evolution (LTE) system, LTE Frequency Division Duplex (FDD) system, LTE Time Division Duplex (TDD) system, Long Term Evolution Advanced (LTE-A) system, Universal Mobile Telecommunication System (UMTS), Worldwide interoperability for Microwave Access (WiMAX) system, 5G New Radio (NR) system, etc. These various systems include terminal device and network device. The system may also include the core network part, such as the Evolved Packet System (EPS), 5G system (5GS), etc.

The terminal device involved in the embodiments of the present application may be a device that provides voice and/or data connectivity to users, a handheld device with a wireless connection function, or other processing devices connected to a wireless modem, etc. In different systems, the names of terminal device may also be different, for example, in a 5G system, the terminal device may be called User Equipment (UE). Wireless terminal device can communicate with one or more core networks (Core Network, CN) via a Radio Access Network (RAN). The radio terminal device may be a mobile terminal device, such as a mobile phone (also known as a “cell phone”) and a computer with mobile terminal device, which may be, for example, portable, pocket-sized, handheld, computer-built-in or vehicle-mounted mobile apparatuses, which exchange language and/or data with the radio access network. For example, Personal Communication Service (PCS) phones, cordless phones, Session Initiated Protocol (SIP) phones, Wireless Local Loop (WLL) stations, Personal Digital Assistants (PDA) and other devices. Wireless terminal device may also be called a system, a subscriber unit, a subscriber station, a mobile station, a mobile, a remote station, or an access point, a remote terminal device (remote terminal), an access terminal device (access terminal), a user terminal device (user terminal), a user agent, a user device, which are not limited in the embodiments of the present application.

The network side device involved in the embodiment of the present application may be a base station, and the base station may include multiple cells that provide services for terminals. Depending on the specific application occasion, a base station may also be called an access point, or may be a device in the access network that communicates with a radio terminal device through one or more sectors on the air interface, or may be named by another name. The network side device may be used to exchange received air frames with Internet Protocol (IP) packets and act as a router between the radio terminal device and the rest of the access network, where the rest of the access network may include Internet Protocol (IP) communications network. Network device may also coordinate attribute management of the air interface. For example, the network side device involved in the embodiment of the present application may be a network side device (Base Transceiver Station, BTS) in the Global System for Mobile communications (GSM) or Code Division Multiple Access (CDMA), or may be a network side device (NodeB) in the Wide-band Code Division Multiple Access (WCDMA), or may be an evolutionary network device (evolutional Node B, eNB or e-NodeB) in the Long Term Evolution (LTE) system, a 5G base station (gNB) in the 5G network architecture (next generation system), or a Home evolved Node B (HeNB), a relay node, a home base station (femto), a pico base station (pico), etc., which are not limited in the embodiments of the present application. In some network structures, network side devices may include centralized unit (Centralized Unit, CU) nodes and distributed unit (Distributed Unit, DU) nodes. The centralized unit and distributed unit may also be arranged geographically separately.

The network side device and the terminal device may respectively use one or more antennas for Multi Input Multi Output (MIMO) transmission, MIMO transmission may be Single User MIMO (SU-MIMO) or Multiple User MIMO (MU-MIMO). Depending on the shape and quantity of root antenna combinations, MIMO transmission may be 2D-MIMO, 3D-MIMO, FD-MIMO or massive-MIMO, or may be diversity transmission, precoding transmission or beamforming transmission, etc.

Those skilled in the art will understand that embodiments of the present application may be provided as methods, systems, or computer program products. Accordingly, the present application may take the form of an entirely hardware embodiment, an entirely software embodiment, or an embodiment that combines software and hardware aspects. Furthermore, the present application may take the form of a computer program product implemented on one or more computer-usable storage media (including, but not limited to, magnetic disk storage and optical storage, etc.) embodying computer-usable program code therein.

The present application is described with reference to flowcharts and/or block diagrams of methods, devices (systems), and computer program products according to the embodiments of the present application. It will be understood that each process and/or block in the flowchart and/or block diagram, and the combination of process and/or block in the flowchart and/or block diagram, may be implemented by computer-executable instructions. These computer-executable instructions may be provided to a processor of a general-purpose computer, special-purpose computer, embedded processor, or other programmable data processing device to produce a machine such that the instructions executed by the processor of the computer or other programmable data processing device produce an apparatus for implementing the functions specified in a process or processes in a flowchart and/or in a block or blocks in a block diagram.

These processor-executable instructions may also be stored in a processor-readable memory that causes a computer or other programmable data processing device to operate in a particular manner, such that the generation of instructions stored in the processor-readable memory includes the manufacture of the instruction apparatus, the instruction apparatus implements the function specified in a process or processes in the flowchart and/or in a block or blocks in the block diagram.

These processor-executable instructions may also be loaded onto a computer or other programmable data processing device, which causes a series of operational steps to be performed on the computer or other programmable device to produce computer-implemented processing, so that the instructions executed on a computer or other programmable device provide steps for implementing the functions specified in a process or processes in a flowchart and/or in a block or blocks in a block diagram.

It should be noted that it should be understood that the division of each module above is only a division of logical functions. In actual implementation, it can be fully or partially integrated into a physical entity, or it can also be physically separated, and these modules may all be implemented in the form of software calling through processing components; these modules may also all be implemented in the form of hardware; some modules may also be implemented in the form of software calling through processing components, and some modules may be implemented in the form of hardware. For example, the determination module may be a separate processing element, or may be integrated into a certain chip of the above-mentioned apparatus, in addition, the determination module may also be stored in the memory of the above-mentioned apparatus in the form of program code, and the function of the above-mentioned determination module is called and executed by a certain processing element of the above-mentioned apparatus. The implementation of other modules is similar. In addition, all or part of these modules may be integrated together or implemented independently. The processing element described here may be an integrated circuit with signal processing capabilities. During the implementation process, each step of the above-mentioned method or each of the above modules may be completed by instructions in the form of hardware integrated logic circuits or software in the processor element.

For example, each module, unit, sub-unit or sub-module may be one or more integrated circuits used to implement the above-mentioned method, such as: one or more application specific integrated circuits (ASICs), or one or multiple microprocessors (digital signal processor, DSP), or one or more field programmable gate arrays (FPGAs), etc. For another example, when one of the above modules is implemented in the form of a processing element scheduling the program code, the processing element may be a general-purpose processor, such as a central processing unit (CPU) or other processors that may call the program code. For another example, these modules may be integrated together and implemented in the form of a system-on-a-chip (SOC).

The terms "first", "second", etc. in the specification and claims of the present disclosure are used to distinguish similar objects and are not necessarily used to describe a specific order or sequence. It should be understood that the data so used are interchangeable under appropriate circumstances so that the embodiments of the present disclosure described herein may be implemented, for example, in sequences other than those illustrated or described herein. In addition, the terms "including" and "having" and any variations thereof are intended to cover non-exclusive inclusions, e.g., a process, method, system, product, or device including a sequence of steps or units needs not be limited to those steps or units that are expressly listed, but may include other steps or units that are not expressly listed or that are inherent to the process, method, product, or device. In addition, the use of "and/or" in the specification and claims indicates at least one of the connected objects, for example, A and/or B and/or C indicates 7 cases that A alone, B alone, C alone, and both A and B exist, both B and C exist, both A and C exist, and A, B and C all exist. Similarly, the use of "at least one of A and B" in this specification and in the claims should be understood to "A alone, B alone, or both A and B exist."

Obviously, those skilled in the art can make various changes and modifications to the present application without departing from the spirit and scope of the present application. In this way, if these modifications and variations of the present application fall within the scope of the claims of the present application and equivalent technologies, the present application is also intended to include these modifications and variations.

What is claimed is:

1. A repetition determination method, comprising:

obtaining, by a terminal, a random access response (RAR), wherein the RAR comprises an uplink (UL) grant and first information other than the UL grant;

determining, by the terminal, a number of repetitions for an initial transmission of an Msg3 PUSCH according to the UL grant and the first information; and determining, by the terminal, one or more target slots for transmitting the Msg3 PUSCH according to the number of repetitions for the initial transmission of the Msg3 PUSCH and available slots for transmitting the Msg3 PUSCH, wherein the determining, by the terminal, the number of repetitions for the initial transmission of the Msg3 PUSCH according to the UL grant and the first information comprises: determining the number of repetitions for the initial transmission of the Msg3 PUSCH according to one or more reserved bits in the first information and one or more reserved bits in the UL grant.

2. The method according to claim 1, wherein the method further comprises:

receiving a first indication signaling sent by a network side device, wherein the first indication signaling is used to indicate any of the following:

indicating the terminal to determine the number of repetitions for the initial transmission of the Msg3 PUSCH according to the first information;

indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant, wherein the determining, by the terminal, the number of repetitions for the initial transmission of the Msg3 PUSCH according to the UL grant and the first information further comprises: determining the number of repetitions for the initial transmission of the Msg3 PUSCH according to a value range of a timing advance (TA) value carried in the first information and indication information carried in the UL grant, wherein the determining the number of repetitions for the initial transmission of the Msg3 PUSCH according to the value range of the timing advance (TA) value carried in the first information and the indication information carried in the UL grant comprises at least one of the following methods:

determining, through the value range of TA value carried in the first information, a time domain resource allocation table used; indicating, through a time domain resource allocation (TDRA) indication field carried in the UL grant, time domain resource allocation information in the time domain resource allocation table; and determining the number of repetitions for the initial transmission of the Msg3 PUSCH according to the time domain resource allocation information;

determining, through the value range of TA value carried in the first information, a value range of the number of repetitions for the initial transmission of the Msg3 PUSCH; indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH; determining, through second indication information carried in the UL grant, a number of repetitions indicated by the UL grant; and determining the number of repetitions for the initial transmission of the Msg3 PUSCH according to the scaling factor and the number of repetitions indicated by the UL grant.

3. The method according to claim 1, wherein the method further comprises:

determining the available slots for transmitting the Msg3 PUSCH according to a predefined rule or a network indication.

4. The method according to claim 3, wherein the determining the available slots for transmitting the Msg3 PUSCH according to the predefined rule comprises one of the following methods:

only using semi-static uplink slots as the available slots for transmitting the Msg3 PUSCH; or, using semi-static uplink slots and semi-static flexible slots as the available slots for transmitting the Msg3 PUSCH, wherein the semi-static flexible slots do not comprise a semi-static flexible symbol configured to transmit at least one of the following channels or pieces of information:

synchronization signal block (SSB);

control resource set (CORESET) #0; or type0 common search space (CSS).

5. The method according to claim 3, wherein the determining the available slots for transmitting the Msg3 PUSCH according to the network indication comprises:

receiving second indication signaling sent by a network side device, wherein the second indication signaling is used to indicate the terminal to determine the available slots for transmitting the Msg3 PUSCH according to one of the following methods:

only using semi-static uplink slots as the available slots for transmitting the Msg3 PUSCH; or, using semi-static uplink slots and semi-static flexible slots as the available slots for transmitting the Msg3 PUSCH, wherein the semi-static flexible slots do not comprise a semi-static flexible symbol configured to transmit at least one of the following channels or pieces of information:

synchronization signal block (SSB);

control resource set (CORESET) #0; or type0 common search space (CSS).

6. A repetition determination method, comprising:

indicating, by a network side device, a terminal of a number of repetitions for an initial transmission of an Msg3 PUSCH through an uplink (UL) grant and first information other than the UL grant in a random access response (RAR); and determining, by the network side device, one or more target slots for transmitting the Msg3 PUSCH according to the number of repetitions for the initial transmission of the Msg3 PUSCH and the available slots for transmitting the Msg3 PUSCH, wherein the indicating, by the network side device, the terminal of the number of repetitions for the initial transmission of the Msg3 PUSCH through the uplink (UL) grant and first information other than the UL grant in the random access response (RAR) comprises: indicating, through one or more reserved bits in the first information and one or more reserved bits in the UL grant, the terminal of the number of repetitions for the initial transmission of the Msg3 PUSCH.

7. The method according to claim 6, wherein the method further comprises:

sending first indication signaling to the terminal, wherein the first indication signaling is used to indicate any of the following:

indicating the terminal to determine the number of repetitions for the initial transmission of the Msg3 PUSCH according to the first information;

indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant, wherein the indicating, by the network side device, the terminal of the number of repetitions for the initial transmission of the Msg3 PUSCH through the UL grant and first information other than the UL grant in the random access response (RAR) further comprises: indicating the terminal of the number of repetitions for the initial transmission of the Msg3 PUSCH according to a value range of a timing advance (TA) value carried in the first information and indication information carried in the UL grant, wherein the indicating the terminal of the number of repetitions for the initial transmission of the Msg3 PUSCH according to the value range of the timing advance (TA) value carried in the first information and indication information carried in the UL grant comprises at least one of the following methods:

determining, through the value range of TA value carried in the first information, a time domain resource allocation table used by the terminal; indicating, through a time domain resource allocation (TDRA) indication field carried in the UL grant, time domain resource allocation information in the time domain resource allocation table; and indicating the terminal of the number of repetitions for the initial transmission of the Msg3 PUSCH according to the time domain resource allocation information;

determining, through the value range of TA value carried in the first information, a value range of the number of repetitions for the initial transmission of the Msg3 PUSCH for the terminal, indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH for the terminal; determining, through second indication information carried in the UL grant, a number of repetitions indicated by the UL grant; and determining the number of repetitions for the initial transmission of the Msg3 PUSCH for the terminal according to the scaling factor and the number of repetitions indicated by the UL grant.

8. The method according to claim 6, wherein the method further comprises:

determining the available slots for transmitting the Msg3 PUSCH according to a predefined rule.

9. The method according to claim 8, wherein the determining the available slots for transmitting the Msg3 PUSCH according to the predefined rule comprises one of the following methods:

only using semi-static uplink slots as the available slots for transmitting the Msg3 PUSCH; or, using semi-static uplink slots and semi-static flexible slots as the available slots for transmitting the Msg3 PUSCH, wherein the semi-static flexible slots do not comprise a semi-static flexible symbol configured to transmit at least one of the following channels or pieces of information:

synchronization signal block (SSB);

control resource set (CORESET) #0; or type0 common search space (CSS).

10. The method according to claim 6, wherein the method further comprises:

sending second indication signaling to the terminal, wherein the second indication signaling is used to indicate the terminal to determine the available slots for transmitting the Msg3 PUSCH according to one of the following methods:

only using semi-static uplink slots as the available slots for transmitting the Msg3 PUSCH; or, using semi-static uplink slots and semi-static flexible slots as the available slots for transmitting the Msg3 PUSCH, wherein the semi-static flexible slots do not comprise a semi-static flexible symbol configured to transmit at least one of the following channels or pieces of information:

synchronization signal block (SSB);

control resource set (CORESET) #0; or type0 common search space (CSS).

11. A network side device, comprising a memory, a transceiver, and a processor, wherein the memory is used to store computer program, the transceiver is used to send and receive data under the control of the processor, and the processor is used to read the computer program in the memory and perform the following operations of the repetition determination method according to claim 6.

12. The network side device according to claim 11, wherein the transceiver is further used to:

send first indication signaling to the terminal, wherein the first indication signaling is used to indicate any of the following:

indicating the terminal to determine the number of repetitions for the initial transmission of the Msg3 PUSCH according to the first information;

indicating the terminal to determine the number of repetitions for the initial transmission of the Msg3 PUSCH according to the UL grant; or, indicating the terminal to determine the number of repetitions for the initial transmission of the Msg3 PUSCH according to the first information and the UL grant, wherein the processor is used to read the computer program in the memory and further perform the following operations of: indicating the terminal of the number of repetitions for the initial transmission of the Msg3 PUSCH according to a value range of a timing advance (TA) value carried in the first information and indication information carried in the UL grant, wherein the processor is used to read program instructions in the memory and perform at least one of the following operations of:

determining, through the value range of TA value carried in the first information, a time domain resource allocation table used by the terminal; indicating, through a time domain resource allocation (TDRA) indication field carried in the UL grant, time domain resource allocation information in the time domain resource allocation table; and indicating the terminal of the number of repetitions for the initial transmission of the Msg3 PUSCH according to the time domain resource allocation information;

determining, through the value range of TA value carried in the first information, a value range of the number of repetitions for the initial transmission of the Msg3 PUSCH for the terminal; indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH for the terminal; determining, through second indication information carried in the UL grant, a number of repetitions indicated by the UL grant; and determining the number of repetitions for the initial transmission of the Msg3 PUSCH for the terminal according to the scaling factor and the number of repetitions indicated by the UL grant.

13. The network side device according to claim 11, wherein the processor is used to read program instructions in the memory and perform the following operations of:

determining the available slots for transmitting the Msg3 PUSCH according to a predefined rule.

14. The network side device according to claim 13, wherein the processor is used to read program instructions in the memory and perform at least one of the following operations of:

only using semi-static uplink slots as the available slots for transmitting the Msg3 PUSCH; or, using semi-static uplink slots and semi-static flexible slots as the available slots for transmitting the Msg3 PUSCH, wherein the semi-static flexible slots do not comprise a semi-static flexible symbol configured to transmit at least one of the following channels or pieces of information:

synchronization signal block (SSB);

control resource set (CORESET) #0; or type0 common search space (CSS).

15. The network side device according to claim 13, wherein the transceiver is further used to:

send second indication signaling to the terminal, wherein the second indication signaling is used to indicate the terminal to determine the available slots for transmitting the Msg3 PUSCH according to one of the following methods:

only using semi-static uplink slots as the available slots for transmitting the Msg3 PUSCH; or, using semi-static uplink slots and semi-static flexible slots as the available slots for transmitting the Msg3 PUSCH, wherein the semi-static flexible slots do not comprise a semi-static flexible symbol configured to transmit at least one of the following channels or pieces of information:

synchronization signal block (SSB);

control resource set (CORESET) #0; or type0 common search space (CSS).

16. A terminal, comprising: a memory, a transceiver, and a processor, wherein the memory is used to store program instructions, the transceiver is used to send and receive data under the control of the processor, and the processor is used to read the program instructions in the memory and perform the following operations of:

obtaining a random access response (RAR), wherein the RAR comprises an uplink (UL) grant and first information other than the UL grant;

determining a number of repetitions for an initial transmission of an Msg3 PUSCH according to the UL grant and the first information; and determining one or more target slots for transmitting the Msg3 PUSCH according to the number of repetitions for the initial transmission of the Msg3 PUSCH and available slots for transmitting the Msg3 PUSCH, wherein the processor is used to read program instructions in the memory and perform the following operations of: determining the number of repetitions for the initial transmission of the Msg3 PUSCH according to one or more reserved bits in the first information and one or more reserved bits in the UL grant.

17. The terminal according to claim 16, wherein the transceiver is further used to:

receive a first indication signaling sent by a network side device, wherein the first indication signaling is used to indicate any of the following:

indicating the terminal to determine the number of repetitions for the initial transmission of the Msg3 PUSCH according to the first information;

indicating the terminal to determine the number of repetitions for the initial transmission of the Msg3 PUSCH according to the UL grant, or, indicating the terminal to determine the number of repetitions for the initial transmission of the Msg3 PUSCH according to the first information and the UL grant, wherein the processor is used to read program instructions in the memory and further perform the following operations of: determining the number of repetitions for the initial transmission of the Msg3 PUSCH according to a value range of a timing advance (TA) value carried in the first information and indication information carried in the UL grant, wherein the processor is used to read program instructions in the memory and perform at least one of the following operations of:

determining, through the value range of TA value carried in the first information, a time domain resource allocation table used; indicating, through a time domain resource allocation (TDRA) indication field carried in the UL grant, time domain resource allocation information in the time domain resource allocation table; and determining the number of repetitions for the initial transmission of the Msg3 PUSCH according to the time domain resource allocation information;

determining, through the value range of TA value carried in the first information, a value range of the number of repetitions for the initial transmission of the Msg3 PUSCH; indicating, through first indication information carried in the UL grant, the number of repetitions for the initial transmission of the Msg3 PUSCH within the value range of the number of repetitions; or, determining, through the value range of TA value carried in the first information, a scaling factor of the number of repetitions for the initial transmission of the Msg3 PUSCH; determining, through second indication information carried in the UL grant, a number of repetitions indicated by the UL grant; and determining the number of repetitions for the initial transmission of the Msg3 PUSCH according to the scaling factor and the number of repetitions indicated by the UL grant.

18. The terminal according to claim 16, wherein the processor is used to read program instructions in the memory and perform the following operations of:

determining the available slots for transmitting the Msg3 PUSCH according to a predefined rule or a network indication.

19. The terminal according to claim 18, wherein the processor is used to read program instructions in the memory and perform at least one of the following operations of:

only using semi-static uplink slots as the available slots for transmitting the Msg3 PUSCH; or, using semi-static uplink slots and semi-static flexible slots as the available slots for transmitting the Msg3 PUSCH, wherein the semi-static flexible slots do not comprise a semi-static flexible symbol configured to transmit at least one of the following channels or pieces of information:

synchronization signal block (SSB);

control resource set (CORESET) #0; or type0 common search space (CSS).

20. The terminal according to claim 18, wherein the transceiver is further used to:

receive second indication signaling sent by a network side device, wherein the second indication signaling is used to indicate the terminal to determine the available slots for transmitting the Msg3 PUSCH according to one of the following methods:

only using semi-static uplink slots as the available slots for transmitting the Msg3 PUSCH; or, using semi-static uplink slots and semi-static flexible slots as the available slots for transmitting the Msg3 PUSCH, wherein the semi-static flexible slots do not comprise a semi-static flexible symbol configured to transmit at least one of the following channels or pieces of information:

synchronization signal block (SSB);

control resource set (CORESET) #0; or type0 common search space (CSS).

* * * * *